(12) United States Patent
Bari et al.

(10) Patent No.: US 12,006,270 B2
(45) Date of Patent: Jun. 11, 2024

(54) FERTILIZERS DERIVED FROM DATE SYRUP

(71) Applicant: KING SAUD UNIVERSITY, Riyadh (SA)

(72) Inventors: Ahmed Bari, Woodbridge (CA); Suleiman Binabdulaziz Aljarboa, Riyadh (SA); Saeed Ali Syed, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 347 days.

(21) Appl. No.: 17/164,370

(22) Filed: Feb. 1, 2021

(65) Prior Publication Data

US 2021/0363072 A1    Nov. 25, 2021

Related U.S. Application Data

(62) Division of application No. 16/882,479, filed on May 23, 2020, now Pat. No. 10,941,084.

(51) Int. Cl.
*C05F 11/10* (2006.01)
*C05G 1/00* (2006.01)

(52) U.S. Cl.
CPC ............ *C05F 11/10* (2013.01); *C05G 1/00* (2013.01)

(58) Field of Classification Search
CPC . C05F 11/10; C05F 5/006; C05G 1/00; C05D 9/02
See application file for complete search history.

(56) References Cited

U.S. PATENT DOCUMENTS 9,896,342 B1    2/2018   Alshatwi et al.
2011/0195161 A1*  8/2011   Upreti .................. A23L 2/60
                                                  426/103

(Continued)

FOREIGN PATENT DOCUMENTS

CN    103880520 A   6/2014
DE    2459226 A1    6/1976
FR    2340689 A1    9/1977

OTHER PUBLICATIONS

Moulik, Satya P., and Asoka K. Mitra. "Fundamental studies on the interaction of carbohydrates with alkaline-earth metals.: Part III. Reaction of D-glucose and maltose with the hydroxides of Ba2+, Ca2+, Mg2+, and Sr2+." Carbohydrate Research 28.2 (1973) (Year: 1973).*

(Continued)

*Primary Examiner* — Jennifer A Smith
(74) *Attorney, Agent, or Firm* — Nath, Goldberg & Meyer; Richard C. Litman

(57) ABSTRACT

The fertilizers derived from date syrup may include date sugar acids chelated to at least one metal ion useful for promoting plant growth. The date acids may be synthesized from waste or non-consumable dates. The fertilizers derived from date syrup may be synthesized by extracting date syrup from dried dates, oxidizing the date syrup to obtain date acids, and chelating the date acids to at least one metal ion. The at least one metal ion may be selected from the group consisting of potassium, calcium, magnesium, copper, iron, manganese, molybdenum, zinc, and a combination thereof.

6 Claims, 3 Drawing Sheets

(56) References Cited

U.S. PATENT DOCUMENTS

2011/0286920 A1\* 11/2011 Jeong .................. A61K 51/081
                                                    424/1.69
2013/0233036 A1\* 9/2013 Hoxsey .................... B09C 1/08
                                                    210/669

OTHER PUBLICATIONS

D-Glucose, compd. with calcium hydroxide (1:2) (CAS Registry No. 50930-43-3) retrieved 2023 (Year: 2023).\*
Millipore Sigma, "Gluconic acid potassium salt" (2019). (Year: 2019).\*
Al-Mamary, Mohammed, Molham Al-Habori, and Adel S. Al-Zubairi. "The in vitro antioxidant activity of different types of palm dates (Phoenix dactylifera) syrups." Arabian Journal of Chemistry 7.6 (2014): 964-971.‡
Mohamed, Rania MA, et al. "Chemical composition, antioxidant capacity, and mineral extractability of Sudanese date palm (*Phoenix dactylifera* L.) fruits." Food science nutrition 2.5 (2014): 478-489.‡
Ashraf, Zahra and Hamidi-Esfahani, Zohreh, "Date and Date Processing: A Review", Food Reviews International, 27(2): pp. 101-133 (2011).
Al-Farsi, Mohamed Ali and Lee, Chang Yong, "Nutritional and Functional Properties of Dates: A Review", Critical Reviews in Food Science and Nutrition, 48(10): pp. 877-887 (2008).

\* cited by examiner
‡ imported from a related application

FERTILIZERS DERIVED FROM DATE SYRUP

CROSS REFERENCE TO RELATED APPLICATIONS

This application is a division of parent application Ser. No. 16/882,479, filed May 23, 2020, pending, the priority of which is claimed.

BACKGROUND

1. Field

The disclosure of the present patent application relates to fertilizers, and particularly to fertilizers derived from date syrup.

2. Description of the Related Art

Saudi Arabia is the third largest producer of dates in the world with a current production of 837,000 Metric tons of dates produced annually from different regions. Dates are high in sugar, with roughly 75% of a single date being sugars, including glucose, fructose and sucrose. Around 5% of the dates are either dried before reaching to the market or are in a non-consumable form. Thus, the existing date manufacturing process produces a significant volume of waste or non-consumable dates.

Fertilizers generally include one or more forms of nitrogen, phosphorus, or potassium, nutrients which are critical for plant growth. However, fertilizers face many challenges, including barriers to uptake and the cost of raw materials. Studies have shown that the majority of nitrogen applied as a fertilizer to soil is not actually used by plants. Rather, it either is washed into surrounding bodies of water or may filter into the groundwater.

A compound in the form of a ring that contains a metal ion attached by coordinate bonds to at least two nonmetal ions is called chelate. Many important biological substances, such as chlorophyll and the heme of hemoglobin, are chelates. The ions or molecules surrounding the metal are called ligands. Ligands are generally bound to a metal ion by a coordinate covalent bond (donating electrons from a lone electron pair into an empty metal orbital), and are thus said to be coordinated to the ion. Chelates are used in analytical chemistry, in agriculture and horticulture as carriers of essential trace metals.

Chelated ion forms reduce the ability of micronutrients to react with the soil thereby improving the availability of the micronutrients for plant intake. The process of chelation with carbohydrates results in the final compound becoming neutral, which prevents the chelate from interacting with other dietary components or deactivating other nutritional compounds (such as vitamins).

Thus, fertilizers derived from date syrup solving the aforementioned problems are desired.

SUMMARY

The fertilizers derived from date syrup may include date sugar acids chelated to at least one metal ion useful for promoting plant growth. The date acids may be synthesized from waste or non-consumable dates. The fertilizers derived from date syrup may be synthesized by extracting date syrup from dried dates, oxidizing the date syrup to obtain date acids, and chelating the date acids to at least one metal ion. The at least one metal ion may be selected from the group consisting of potassium, calcium, magnesium, copper, iron, manganese, molybdenum, zinc, and a combination thereof.

In an embodiment, the extraction step may include boiling dried dates in water to form a mixture, filtering the mixture, and concentrating the filtrate to produce a date syrup extract. The concentration may be achieved by evaporation.

In an embodiment, the oxidation step may include heating a mixture of date syrup extract, water, and hydrogen peroxide, adding ferrous sulfate, and adjusting the pH with acetic acid to produce a date acid extract.

In an embodiment, the chelation step may include stirring the date acid extract with water and either potassium carbonate or calcium hydroxide and adding acetic acid, followed by adding more date acid extract under stirring and heating and adding acetic acid under further stirring and heating, after which the mixture may be cooled to room temperature.

In an embodiment, the fertilizers derived from date syrup may be administered to a plant in need thereof. The fertilizers may be administered by soil supplementation, water supplementation, direct administration to the leaves of the plant, or by any other means allowing for the plant to utilize the fertilizers.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
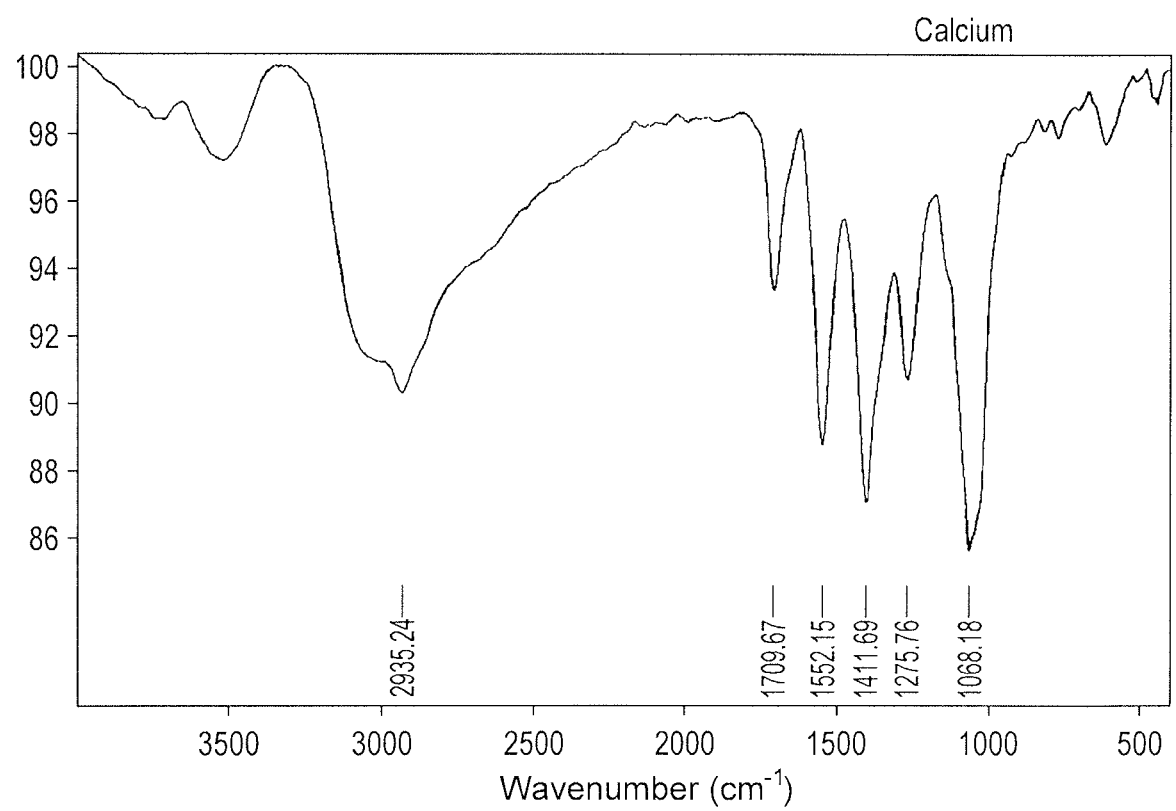
FIG. 1 depicts a FTIR spectrum of the calcium chelated date sugar acids.

The fertilizers derived from date syrup may include date sugar acids chelated to at least one metal ion useful for promoting plant growth. The date acids may be synthesized from waste or non-consumable dates. The fertilizers derived from date syrup may be synthesized by extracting date syrup from dried dates, oxidizing the date syrup to obtain date acids, and chelating the date acids to at least one metal ion. The at least one metal ion may be selected from the group consisting of potassium, calcium, magnesium, copper, iron, manganese, molybdenum, zinc, and a combination thereof.

In an embodiment, the extraction step may include boiling dried dates in water to form a mixture, filtering the mixture, and concentrating the filtrate to produce a date syrup extract. The concentration may be achieved by evaporation.

In an embodiment, the oxidation step may include heating a mixture of date syrup extract, water, and hydrogen peroxide, adding ferrous sulfate, and adjusting the pH with acetic acid to produce a date acid extract.

In an embodiment, the chelation step may include stirring the date acid extract with water and either potassium carbonate or calcium hydroxide and adding acetic acid, followed by adding more date acid extract under stirring and heating and adding acetic acid under further stirring and heating, after which the mixture may be cooled to room temperature.

In an embodiment, the fertilizers derived from date syrup may be administered to a plant in need thereof. The fertilizers may be administered by soil supplementation, water supplementation, direct administration to the leaves of the plant, or by any other means allowing for the plant to utilize the fertilizers.

In an embodiment, the date syrup may be extracted from waste or non-consumable dates grown in Saudi Arabia.

In an embodiment, the at least one metal ion may be selected from the group consisting of potassium, calcium, and a combination thereof. In a further embodiment, the at least one metal ion may be potassium. In a further embodiment, the at least one metal ion may be calcium.

Date sugars from date syrup can be converted into sugar acids which can then be chelated with various metal ions which are helpful in plant growth. The resulting chelated sugar acids are highly soluble and the chelation of the metal ions significantly reduces the chances that random movements of any of the coordinating groups could result in detachment of the entire molecule. Examples of potential interactions forming the basis of calcium and potassium date sugar acid chelates are illustrated in Formula 1 and Formula 2, respectively.

Formula 1

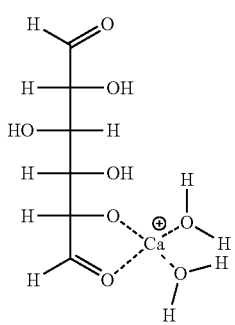

Formula 2

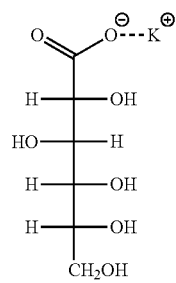

The sugar acids formed from the date syrup are strong enough that they can easily pass through the pores of leaf and root surfaces, directly delivering their chelated metal ions to the plants and avoiding potential waste through runoff or groundwater contamination. Thus, the fertilizers derived from date syrup may be formulated for direct administration to the leaves of plants, or for more traditional soil supplementation.

The fertilizers derived from date syrup include date sugar acids synthesized from large amount of mono, di and polysaccharides. The resulting calcium and potassium date sugar acid chelates thus have improved bioavailability, which in turn increases their effectiveness as fertilizers.

There are many types of sugars present in dates, such as glucose, sucrose and fructose. Therefore, when the date syrup is converted into date acids, the date acids will include glucuronic, glucaric and gluconic acids and their lactones. These acids can be produced by oxidation with hydrogen peroxide in the presence of catalytic amount of ferrous sulfate.

The following examples further illustrate the present teachings.

Example 1

Extracting Date Syrup

Date acids were extracted by adding 1 kg of dried dates to 3 liters of water to form a first mixture and boiling the mixture for 3 hours. Water was added during the course of the boiling to maintain the starting total volume of the first mixture. After 3 hours the first mixture was filtered and the filtrate was evaporated to reduce the volume to 200 ml of date syrup extract.

Example 2

Oxidizing Date Syrup Extract 100 ml of the date syrup extract according to Example 1 was added to 20 ml water in 1 a liter flask to form a second mixture. This second mixture was heated at 100° C. and hydrogen peroxide (30 ml) was added in portions over 15 mins, followed by the addition of a catalytic amount of ferrous sulfate ($FeSO_4$ $7H_2O$) (generally 5 to 10 mg per liter). Acetic acid was used to increase the pH of the second mixture to fall between pH=3 and pH=5 (generally about 50 ml to 75 ml acetic acid). Heating was continued for an additional 2 hours and during this time 20 ml of water was added in portions to prevent the second mixture from boiling and to get rid of peroxides in the second mixture. The resulting solution was stored for future use as date acid extract.

Example 3

Chelation of the Date Acids with Potassium

Chelation of the date acid extract of Example 2 with potassium was performed as follows. 25 g liquid weight of the date acid extract of Example 2 was added to a 500 ml beaker. 20 g of water was added to form a third mixture and the third mixture was stirred over a hot plate. 23 g of potassium carbonate was added to the third mixture and stirring was continued for 10 minutes. Then, 5.0 g of acetic acid was added to the third mixture under stirring. A further 25 g liquid weight of the date acid extract of Example 2 was then added to the third mixture, forming a fourth mixture. The fourth mixture was then heated under stirring to 80° C. for 40 minutes. The beaker was covered with a petri dish to avoid any lost volume of the fourth mixture. 1 g of acetic acid was then added to the fourth mixture and heating and stirring was continued for a further 40 minutes. The heat was then turned off and the fourth mixture was allowed to cool to room temperature under stirring. The fourth mixture then turned a dark black color and was allowed to cool to room temperature. The total reaction constituents used to obtain potassium chelated date acids is summarized in Table 1.

TABLE 1

Potassium Chelated Date Acids

| Ingredient | Weight |
| --- | --- |
| Sugar Acid | 50 g |
| Acetic Acid | 6 g |
| Potassium Carbonate | 23 g |
| Water | 20 g |
| Propylene Glycol | 1 g |
| Total | 100 g |

Example 4

Chelation of the Date Acids with Calcium

Chelation of the date acid extract of Example 2 with calcium was performed as follows. 25 g liquid weight of the date acid extract of Example 2 was added to a 500 ml beaker. 42.7 g of water was added to form a third mixture and the third mixture was stirred over a hot plate. 0.3 g of calcium hydroxide was added to the third mixture and stirring was continued for 10 minutes. Then, 5.0 g of acetic acid was added to the third mixture under stirring. A further 25 g liquid weight of the date acid extract of Example 2 was then added to the third mixture, forming a fourth mixture. The fourth mixture was then heated under stirring to 80° C. for 40 minutes. The beaker was covered with a petri dish to avoid any lost volume of the second mixture. 1 g of acetic acid was then added to the fourth mixture and heating and stirring was continued for a further 40 minutes. The heat was then turned off and the fourth mixture was allowed to cool to room temperature under stirring. The fourth mixture then turned a dark black color and was allowed to cool to room temperature. The total reaction constituents used to obtain calcium chelated date acids is summarized in Table 2.

TABLE 2

Calcium Chelated Date Acids

| Ingredient | Weight |
| --- | --- |
| Sugar Acid | 50 g |
| Acetic Acid | 6 g |
| Calcium Hydroxide | 0.3 g |
| Water | 42.7 g |
| Propylene Glycol | 1 g |
| Total | 100 g |

Example 5

Analysis of Date Acid Fertilizers

In order to confirm the presence of calcium and potassium metal ions, the date acid fertilizers synthesized according to the methods of Examples 3 and 4 were analyzed using inductively coupled plasma mass spectrometry. Replicate samples were analyzed to ensure accuracy. The results of this analysis are summarized in Table 3.

TABLE 3

Final Concentration in Percentage

| Elements | CAL-1 | K-7 |
| --- | --- | --- |
| Ca | 0.3052 | 0.2256 |
| K | 3.2513 | 13.5844 |

Figure 2:
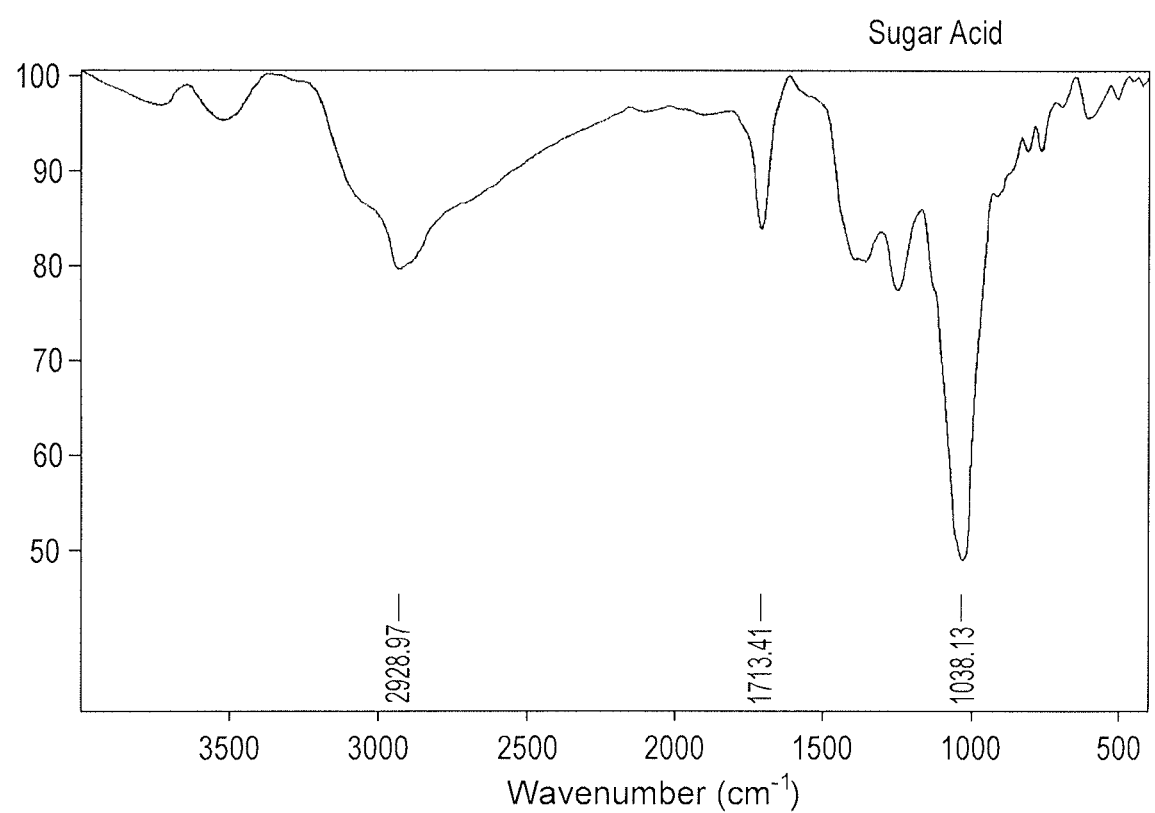
FIG. 2 depicts a FTIR spectrum of the date sugar acids.
Figure 3:
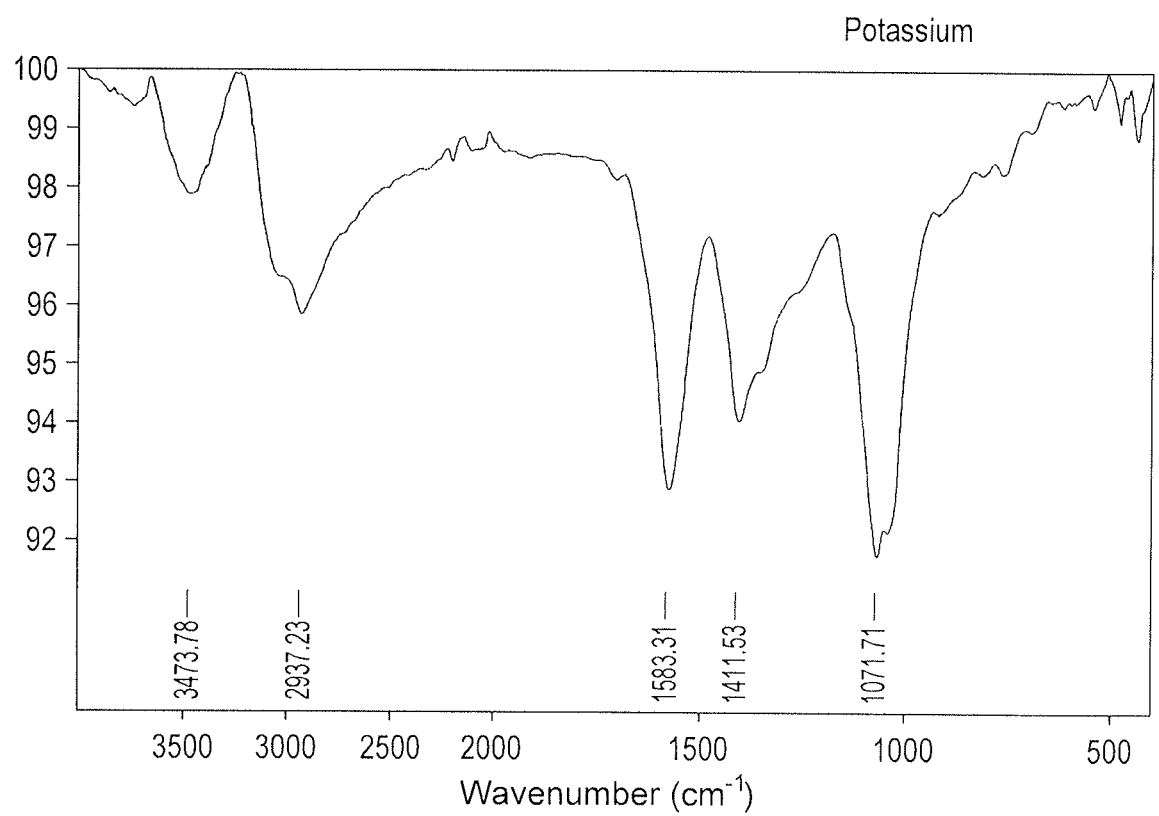
FIG. 3 depicts a FTIR spectrum of the potassium chelated date sugar acids.

Samples of the date acid extract according to Example 2 were compared to samples of the date acid fertilizers synthesized according to the methods of Examples 3 and 4 by Fourier-Transform Infrared Spectroscopy (FTIR) to confirm the presence of metal-sugar bonding. (See FIGS. 1-3) Spectra were recorded in the region of 4000-500 $cm^{-1}$. The very strong band at 1713 $cm^{-1}$ in the sugar acids was assigned to the C=O stretching vibrations of the sugar acids (See FIG. 2). However, when coordinating with metal ions, the carbonyl group shifted to a lower frequency (See FIG. 1 and FIG. 3). Two broad and strong absorption bands at about 1583 and 1411 $cm^{-1}$ were observed in the spectra of potassium chelated sugar acids (FIG. 3). These bands were assigned to the anti-symmetrical and symmetrical stretching vibrations of the OCO group of the sugar bonded through different positions. Similarly, in the calcium chelated sugar acids, stretching vibrations of the OCO group of the sugar appears at around 1552 and 1411 $cm^{-1}$ (FIG. 1).

It is to be understood that the fertilizers derived from date syrup are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A fertilizer composition derived from date syrup consisting of:
   acetic acid;
   water;
   a chemical compound selected from the group consisting of potassium carbonate and calcium hydroxide;
   propylene glycol; and
   a mixture of date sugar acids chelated to at least one metal ion, wherein the mixture of date sugar acids includes gluconic acid, glucaric acid, and glucuronic acid.

2. The fertilizer composition according to claim 1, wherein the at least one metal ion is selected from the group consisting of potassium, calcium, magnesium, copper, iron, manganese, molybdenum, zinc, and a combination thereof.

3. The fertilizer composition according to claim 2, wherein the at least one metal ion is calcium.

4. The fertilizer composition according to claim 2, wherein the at least one metal ion is potassium.

5. A method of fertilizing a plant in need thereof, comprising administering the fertilizer composition of claim 1 to a plant in need thereof.

6. The method of claim 5, wherein the at least one metal ion is selected from the group consisting of calcium and potassium.

* * * * *